March 3, 1970  R. L. GEYER  3,498,799
REFRIGERATED POULTRY PACKAGE AND METHOD OF MAKING SAME
Filed Nov. 18, 1966  2 Sheets-Sheet 1
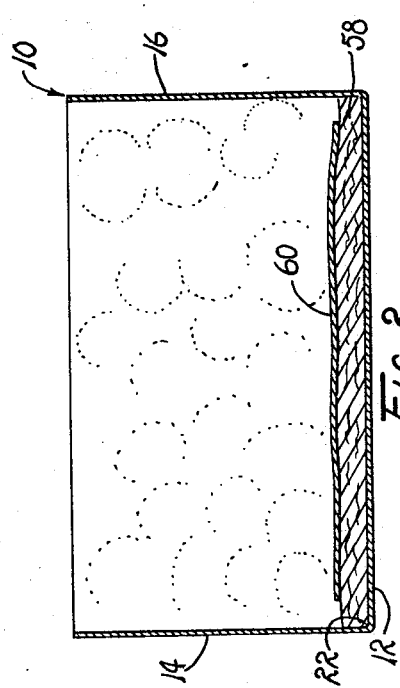
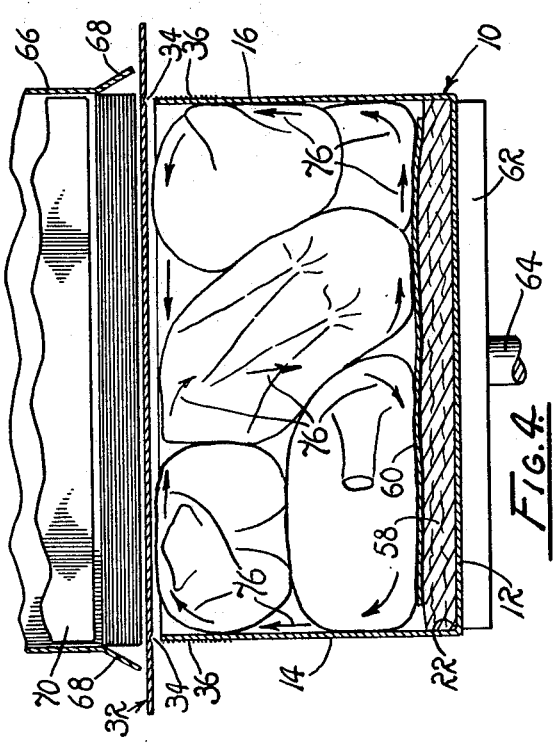
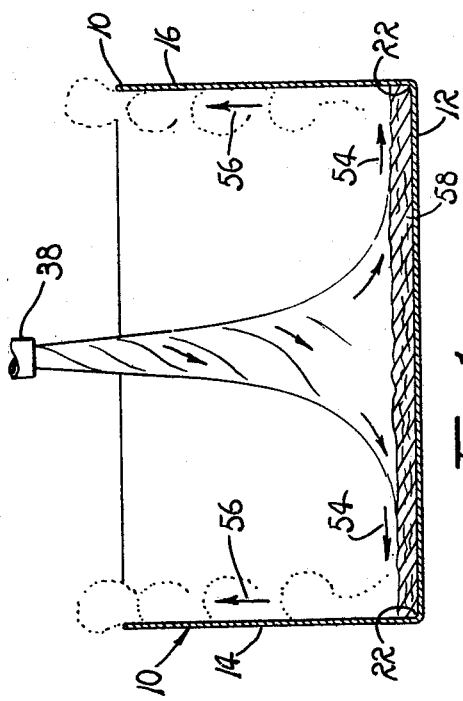
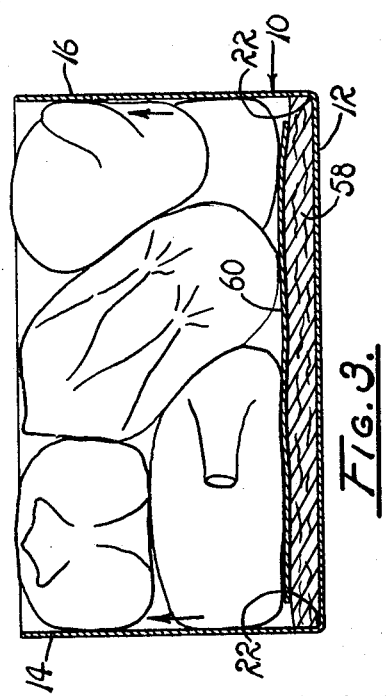
ROBERT L. GEYER
INVENTOR
ATTORNEYS

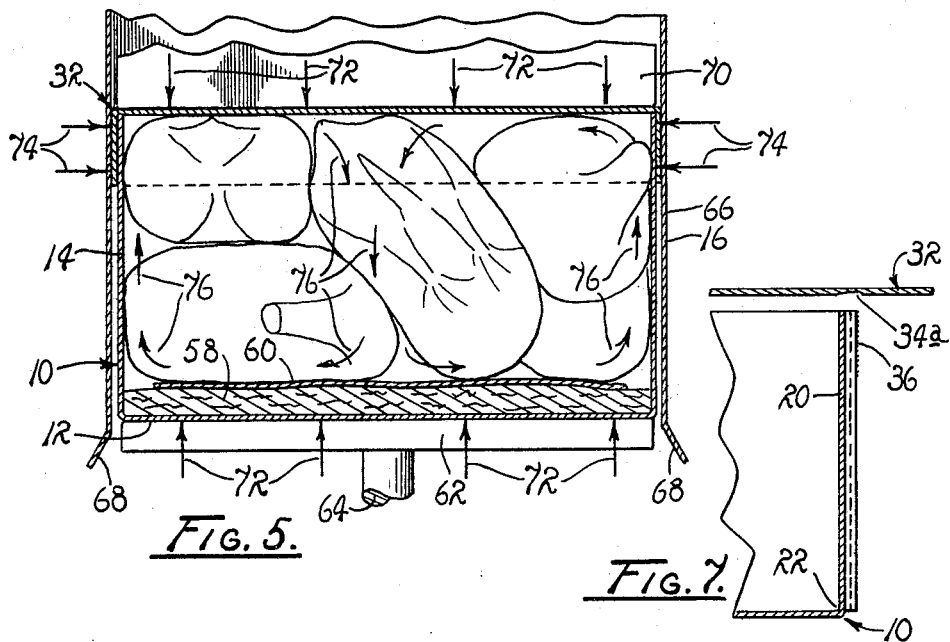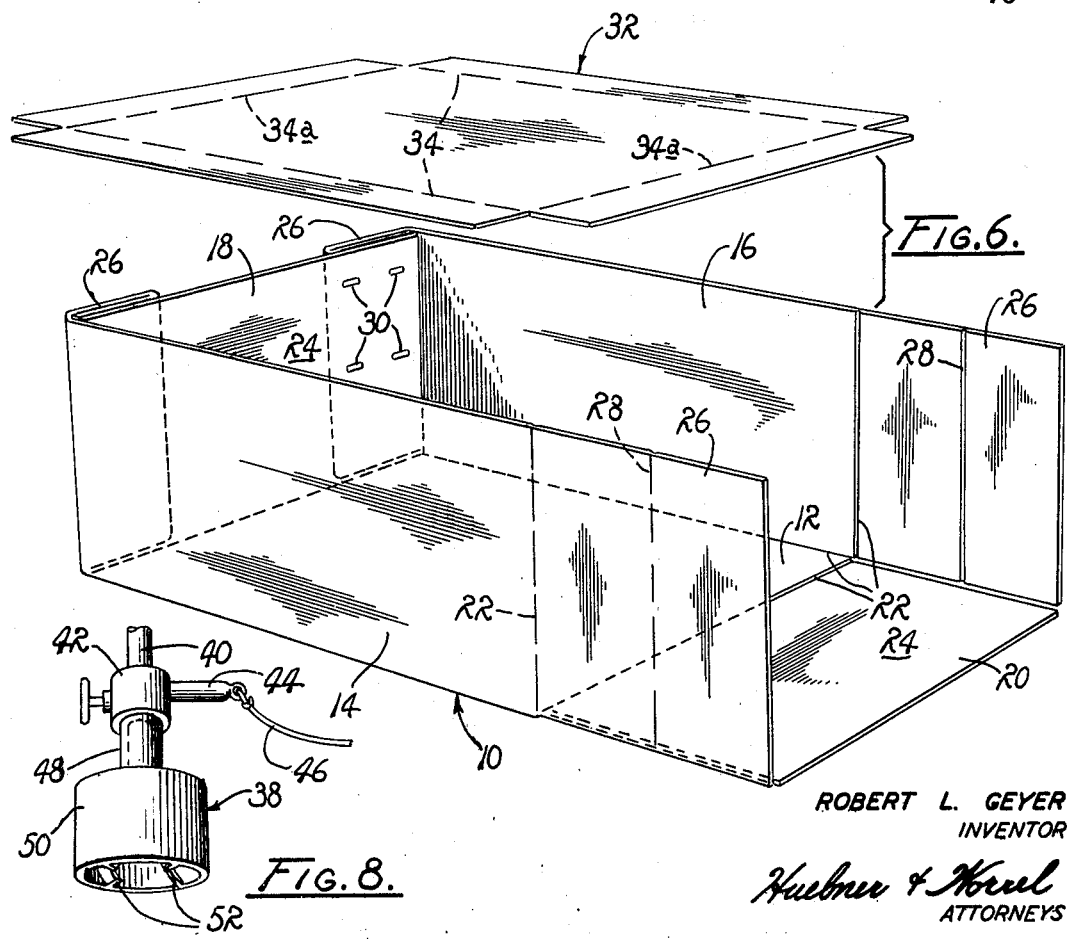

United States Patent Office 3,498,799
Patented Mar. 3, 1970

3,498,799
REFRIGERATED POULTRY PACKAGE AND METHOD OF MAKING SAME
Robert L. Geyer, Merced, Calif., assignor to Foster Poultry Farms, a corporation of California
Filed Nov. 18, 1966, Ser. No. 595,531
Int. Cl. A23b *1/00, 1/06*
U.S. Cl. 99—194                      2 Claims

ABSTRACT OF THE DISCLOSURE

A poultry packaging container and process for packaging poultry, particularly dressed and eviscerated poultry which is subject to weepage of fluids therefrom, characterized by the utilization of a substantially imperforate container having along the bottom thereof a layer of finely divided particles of dry refrigerant material, a weepage absorbent pad substantially covering the refrigerant and disposed thereon, a selected arrangement of dressed poultry disposed along the surface of the absorbent pad and in direct engagement therewith, and a cover member sealingly covering the package, said refrigerant being adapted to sublimate thereby exhausting atmosphere from the container, while serving to rapidly chill the poultry.

---

The present invention relates generally to techniques, methods and containers for packaging food products.

More specifically, the present invention relates to methods and containers for packaging poultry, after the poultry has been dressed and eviscerated, for subsequent shipment to a consumer market and the like.

Heretofore, poultry after having been either completely or partially readied for retail sale has been packaged in different manners, including to large extent use of a wet pack refrigerant, such as crushed ice, in which the poultry has been packed, and in which the container in many instances has consisted of a slatted wooden box having openings between the slats to permit liquid drainage therefrom.

Another method of packaging poultry for shipment to retail outlets and the like consisted in freezing the poultry, and in some instances the poultry before freezing was at least partially wrapped in paper or placed in plastic bags. Another packaging method for shipping of poultry consisted in placing the poultry in paperboard containers, in the bottom of which pieces of solidified frozen carbon dioxide were placed and known and sold in the trade as Dry Ice. In utilizing this latter method the containers in many instances were provided with vent openings or holes, or were otherwise so-formed and constructed as to permit venting to the air. This latter technique of utilizing Dry Ice deposited as solid pieces in the bottoms of containers was primarily utilized where a delivery problems made it desirable, and in many instances paperboard or fiberboard cartons were employed. In some instances pads of fibrous material were layed on top of the Dry Ice slabs, and the eviscerated poultry was placed in the container on the pads. Pads of various material were utilized including wrapping paper, butcher paper, cardboard, corrugated paperboard, and soft, porous moisture absorbent paper. Sometimes chicken parts were prepackaged and the packages placed in the containers on the pads. The containers were then closed with lids which were relatively tightly fitted thereto.

Under certain circumstances, it is becoming increasingly desirable to so-package poultry that it arrives at retail outlets or at the consumer level, in substantially fresh and unfrozen condition and with good color and texture, without contamination or skin bruises or burns and the like. The packaging techniques and containers heretofore utilized do not fully and completely meet these requirements.

It is accordingly a primary object of the present invention to utilize new techniques and concepts for the packaging of poultry to fulfill consumer desires, including a new process and composite container for packaging of poultry for shipment.

Another object is to market poultry and the like in improved condition.

Another object is to provide a process and container for packaging poultry which maintains the packaged poultry in substantially fresh, dry, uncontaminated and unblemished condition over the period of time required for shipment of poultry in so-called first day farm fresh condition.

An additional object is to provide a process and packaging container wherein atmospheric air which tends to cause contamination or deterioration of poultry packaged in the container is substantially exhausted from the container, and means are provided whereby the intrusion of such possibly contaminating atmospheric air is minimized or prevented over a period of time sufficient to permit marketing.

A still further object is to provide a substantially imperforate moisture proof packaging and shipping container for poultry, and incorporating means for creating and establishing a circulation therein of carbon dioxide gas in conjunction with a substantially airtight construction to prevent ingress of atmospheric air into the container and wherein use is made of a differential in pressures within and without the container to permit the slow gradual egress of gaseous carbon dioxide to the atmosphere, to thereby minimize or prevent ingress of atmospheric air.

Another object is to provide a technique, process and package container wherein a particulate solid form of carbon dioxide is utilized as the refrigerant medium, which is permitted slowly and continuously to sublimate to gaseous form thereby to create a continuous circulation of gaseous carbon dioxide through and out of said container to prevent ingress of air into the interior of the container, and wherein means are provided for at least partially absorbing weepage of packaged poultry thereby to facilitate maintaining the poultry in a substantially dry state.

An additional object of the present invention is to provide a poultry packaging container which is virtually airtight when closed to thereby prevent heat from entering the container, maintain the bacteria count in the packaged poultry at a minimum, and render the container substantially secure against pilferage.

A further object of the invention is the provision of a packaging container for poultry adapted for random packing of non-packaged poultry therein.

A still further object of the invention is a process of forming and inserting particulate solid carbon dioxide refrigerant in a container which tends to drive off air or oxygen from the interior of the box and maintain a gaseous air barrier within the box during storage or shipment to thereby reduce spoilage of poultry within the container.

Other and additional objects and advantages of the present invention will be more readily apparent from the following detailed description of embodiments thereof when taken together with the accompanying drawings in which:

FIG. 1 is a schematic sectional view through a container of the present invention depicting insertion of refrigerant material into the container;

FIG. 2 is a view similar to FIG. 1 showing the container after insertion of the refrigerant material;

FIG. 3 is a view similar to FIG. 2 subsequent to insertion of poultry in the container;

FIG. 4 is a schematic view of the container of FIG. 3 disclosing a method of covering, closing and sealing a filled container;

FIG. 5 is a view similar to FIG. 4 showing the container in closed and sealed condition;

FIG. 6 is an exploded perspective view of a container and cover therefor in accordance with the teachings of the present invention;

FIG. 7 is a fragmentary sectional view through a box end and cover showing in greater detail an end score line of a cover adapted to facilitate substantially airtight relationship between the cover and the body of the container; and FIG. 8 is a fragmentary schematic view of a nozzle construction and control mechanism therefor adapted for insertion of the refrigerant material in the container.

Referring now in more detail to the drawings, the container generally designated 10 contemplated and used in practicing the present invention consists of a bottom portion constructed of imperforate material, and includes a bottom 12, sides 14 and 16, and ends 18 and 20. Score lines 22 are provided in a usual and known manner to facilitate folding a blank from a flat plane into an erected container. The ends 18 and 20 include planar inner portions 24, and outer flap portions 26 divided by score lines 28 adapted to permit folding of one portion over the other, as shown in the upper left hand corner of FIG. 6. The portions 24 and 26 can be secured one to another in erected position by staples 30 or the like. The double fold of the outer flap portions substantially enhances the over-all strength of the box. The material of which the container is formed is preferably corrugated paperboard which has been treated or impregnated with a moisture resistant material such as, for example, a thin coating of plastic, wax or oils, all as well known in the trade.

A top or cover for the box is shown at 32 and which is provided with score lines 34 to permit folding downwardly of the peripheral edge portions to form a telescopic type cover, with the so-folded portions being securable in folded position in any desired manner, such as by stapling or gluing to the container during the assembly of the box following insertion of poultry thereinto as will be more specifically described hereinafter. The top or cover is constructed of the same material as the bottom portion of the container and similarly is imperforate and moisture proof. This cover is adapted to tightly engage over the open top of the container and the exterior sides thereof, so as to be in substantially airtight engagement with the container. To this end the score lines in the top can have an elongated angular configuration as indicated at 34a, FIG. 7, to accommodate the triple thickness of the ends of the container in assembled condition. Glue, indicated at 36, is applied to the upper portions of the sides and ends of the container prior to application of the top, and the edge flaps of the top when pressed thereagainst, upon placement of the top on the container, will adhere to the container in a substantially airtight manner.

After erection of the container bottom, and prior to placement therein of dressed and eviscerated poultry, a refrigerant material is placed in the interior of the container bottom. As previously herein set forth, refrigerant materials in the nature of blocks or slabs of solid carbon dioxide have been heretofore used as also crushed ice. One of the unique features of the present invention is the utilization of solid carbon dioxide or Dry Ice in the nature of a snow, and the manner of its placement in the container, which has been found to be highly effective and give highly improved end results in the present packaging technique. This material, as above described, is formed by directing a jet or blast of liquid carbon dioxide from a source, not shown, through a suitable nozzle and control device generally designated 38.

Liquid carbon dioxide passes through conduit 40, having a valve 42 therein operable to open and closed positions by a control handle 44 to which is secured a lanyard 46 or the like. It is to be understood that any suitable valve and valve control means can be utilized. Preferably the conduit 40 is covered by insulation, such as at 48, to prevent premature changing of the liquid carbon dioxide into the frozen or solid Dry Ice form and prevents freezing in the conduit. The nozzle 38 includes a cylindrical head or shield 50, disposed at the lower end of the nozzle and extending therebelow. In one workable embodiment of the invention this head or shield has a diameter of approximately six inches and a depth of approximately eight inches. A plurality of helical fins or ribs 52 are provided in the interior of the head or shield. These serve the purpose of providing a swirling or vortex motion to the carbon dioxide passing from the conduit through the shield. As the liquid carbon dioxide passes from the conduit into the head it changes from liquid form to a solid particulate form which is frozen and in the nature of a snow.

The nozzle is placed above the open top 54 of the container bottom and when the valve is opened the liquid carbon dioxide is jetted, in the nature of a blast, downwardly through the head 50 where it is formed into a solid particulate carbon dioxide and forcefully impelled against the bottom 12 of the container, where the force of the blast disseminates it outwardly, as shown in FIG. 1, so as to substantially cover the bottom of the container. The valve is actuated over a sufficient period of time to establish a desired depth of layer of the Dry Ice on the bottom of the container. During this operation of placement of the Dry Ice in the bottom of the container a certain amount of gaseous carbon dioxide and/or solid carbon dioxide, in the nature of a cloud, is formed which rises toward the open top of the container, as indicated at 56, and the force of injection sweeps atmospheric air including oxygen from the interior of the container bottom.

The interior of the container bottom is substantially filled with the gaseous carbon dioxide, perhaps with a partial cloud of crystalline or particulate solidified carbon dioxide which, being heavier than air, will tend to remain in the interior of the container and thereby act to prevent entry thereinto of air and/or oxygen. This, as will be hereinafter explained, in conjunction with additional features of the invention, will tend to prevent contamination or oxidation of poultry placed in the container, and at the same time serve to drive heat out of the container to more adequately prepare the container for insertion of poultry. The layer of carbon dioxide in frozen form is indicated at 58 and, as set forth hereinabove, can be of any desired thickness primarily depending upon the length of time it is anticipated that poultry will be held in the container following insertion, up to the time of removal for sale and/or consumption.

A layer, in the nature of a sheet, of absorbent material 60 is placed on top of the Dry Ice layer and preferably has substantial thickness and is of a fibrous and porous construction such as a non-woven paper or other similar and suitable material. As will be seen from FIG. 2, for example, this sheet of absorbent material preferably terminates short of the interior surfaces of the sides and ends of the container to facilitate currents or circulation of gaseous carbon dioxide within the container. The nature and arrangement of the pad additionally permits a slow and substantially continuous out flow of gaseous carbon dioxide from the interior of the container to the exterior thereof, upon sublimation of the solid carbon dioxide, to aid in preventing ingress of air into the container subsequent to insertion of poultry therein and closing and sealing with the top. In FIG. 2 there is schematically depicted the substantial filling of the interior of the container with gaseous carbon dioxide formed by sublimation of the Dry Ice form of carbon dioxide in the layer at the bottom.

Subsequent to insertion of the Dry Ice in the container, and placement thereover of the layer or sheet of absorbent material, the container is ready for insertion therein of dressed and eviscerated fowl. In practicing the invention, the fowl preferably is random packed in a naked condition, although if desired the individual fowl could be partially or completely wrapped or packaged, and inserted in a desired packaging pattern. The fowl for the most part will be positioned over the top surface of the absorbent material. As is well known freshly dressed fowl tends to weep. The weepage moisture has been found to be substantially absorbed by the absorbent material which thereby aids in maintaining fowl placed in the container in a dry condition. As a matter of fact, there is a slight amount of freezing of the surfaces of fowl in the container in contact with or in proximity to the upper surface of the absorbent material due to its proximity to the Dry Ice thereunder.

Subsequent to placement of the fowl in the container bottom, the lid or cover is applied over the open upper end of the container. Glue 36 is first applied to the sides and ends of the container in proximity to the top thereof as shown in FIG. 4. A lift ram 62 is positioned under and supports the container, and is vertically movable by means of a piston 64 or the like, which can be raised or lowered by any known means such as for example a hydraulic piston. A chute 66 is positioned above the ram 62 of an interior shape and size substantially corresponding to the exterior of the container bottom with the top placed thereon and the container closed. Angularly outwardly disposed aprons 68 are provided at the bottom of the chute to facilitate insertion therein of the container and top. When it is desired to close and/or complete assembly of the container, a container is placed upon the ram 62 and after the glue has been applied the top is positioned over the open end of the container, as shown in FIG. 4, in a substantially flat or planar condition. Thereafter the ram 62 is elevated which thereby forces the container and the juxtaposed top upwardly into the chute. As this occurs the side flaps of the cover are downwardly folded into contact with the exterior surfaces of the container bottom and into gluing and sealing contact therewith.

This step in finalizing of the container is shown in FIG. 5 of the drawings wherein the container with cover in position is shown as being contained within the chute 66.

A container 70 which has previously been filled and closed in the chute is in superimposed relationship with the lower of the containers in the chute. The weight of the previously completed container and contents thereof creates a downward pressure as indicated by arrows 72, which serves the purpose of holding the top in position on the container being sealed while the latter container is passing through the chute. Any desired number of containers can be vertically stacked within the chute at any given time to permit adequate drying of the glue to insure a proper seal of the top on the container bottom, and depending upon the height of the chute and the vertical height of the containers. After the glue has set an uppermost one of the containers will be ejected from the top of the chute. A slight pressure against the flaps of the top is created due to the dimensions and configuration of the interior of the chute, as indicated by arrows at 74 in an obvious manner. As set forth hereinabove, the dimensions and configurations of the score lines 34a facilitate folding of the top flaps over the multiple layer ends of the box and additionally serves to increase the contact sealing area of the top of the container with the upper edges of the container bottom.

After the container has been processed as above described, it is then ready for temporary storage and/or transportation to a retail or consumer outlet. When the container has been so-closed and sealed it is substantially airtight, with a small amount of leakage of gaseous carbon dioxide from the interior thereof to the exterior being permitted between the bottom of the container and the top. A continual slow sublimation of carbon dioxide from the solid to the gaseous form ensues, as will be readily recognized, unless the container is placed under sufficient refrigeration to maintain the carbon dioxide in frozen Dry Ice form. This fact plays an important part in the teachings of the present invention. As the carbon dioxide gasifies it creates convection currents as shown by arrows 76 in FIGS. 4 and 5, assumably outwardly from the center of the container in proximity to the bottom, upwardly along the interiors of the sides due to heat on the exterior of the container, then inwardly along the underside of the top, and downwardly in proximity to the center of the container. It is believed that this creation and continuation of current flow of gaseous carbon dioxide exists and is created by warmth of the atmosphere exteriorly of the container.

At the same time, due to a slight differential between interior gaseous pressure of the gaseous carbon dioxide as compared with the exterior atmospheric pressure, there will be a tendency toward a slight seepage or flow of gaseous carbon dioxide from the interior of the container to the exterior thereof. This prevents infiltration or ingress of the surrounding atmosphere into the interior of the container, to thereby prevent contamination of poultry in the container, reduce the possibility of bacteria formation within the container, and in general results in highly improved results in maintaining poultry in the container in a fresh and desirable condition.

Manifestly, external environmental conditions will affect the length of time during which this action will take place, as also will the amount of Dry Ice placed within the container. The initial condition, temperature and moisture content of poultry placed within the container also play a part in the length of time during which the container of the present invention will be effective for desired refrigeration of poultry therein.

Although the invention has been herein shown and described in what is conceived to be the most practical and preferred process and apparatus, it is recognized that departures may be made therefrom within the scope of the invention, which is not to be limited to the details disclosed herein but is to be accorded the full scope of the claims so as to embrace any and all equivalent processes and apparatus.

Having described my invention, what I claim as new and desire to secure by Letters Patent is:

1. A method of packaging and refrigerating dressed and eviscerated poultry subject to weepage of fluid therefrom, comprising:
   (A) supplying a container of substantially moisture impervious material having a bottom and an opening in upwardly spaced relation to the bottom;
   (B) supplying a cover adapted to be mounted on the container in covering relation to the opening in substantially sealing relation thereto;
   (C) delivering a predetermined quantity of finely divided particles of dry refrigerant to the container to form a layer of sublimating dry refrigerant disposed on the bottom of the container;
   (D) positioning a weepage absorbent pad within the container in an overlying relation to the layer of sublimating refrigerant;
   (E) placing dressed and eviscerated poultry products subject to weepage within the container on the pad in direct contact therewith; and
   (F) closing the container with the cover and effecting a substantially hermetic seal between the cover and the container.

2. A refrigerated poultry package comprising a substantially airtight container of substantially moisture impervious material having a bottom and an opening in upwardly spaced relation to the bottom, a cover mounted on the container in substantially airtight covering relation to the opening, a layer of frozen carbon dioxide refrigerant material disposed on the bottom of the container adapted upon sublimation to refrigerate the container and by conversion to gas to create a positive pressure within the container in opposition to the intrusion of atmosphere and contaminants borne thereby, an absorbent pad disposed on the refrigerant in direct contact therewith, and dressed poultry subject to weepage disposed on the absorbent pad in direct contact therewith whereby the weepage is absorbed from the poultry downwardly into the pad.

References Cited

UNITED STATES PATENTS

| | | |
|---|---|---|
| 1,511,306 | 10/1924 | Slate. |
| 1,924,059 | 8/1933 | Hoskins. |
| 2,838,403 | 6/1958 | Notter. |
| 3,038,284 | 6/1962 | Kaestner _____ 53—383 |
| 3,320,075 | 5/1967 | Lemmons _____ 99—194 X |
| 2,017,504 | 10/1935 | Lohner. |

HYMAN LORD, Primary Examiner